(12) United States Patent
Ninomiya et al.

(10) Patent No.: US 7,037,957 B2
(45) Date of Patent: May 2, 2006

(54) WATER-BASED INK COMPRISING COLORED PARTICLES AND IMAGE FORMING METHOD USING THE SAME

(75) Inventors: Hidetaka Ninomiya, Mitaka (JP); Hiroaki Ando, Hachiaji (JP)

(73) Assignee: Konica Corporation, (JP)

( * ) Notice: Subject to any disclaimer, the term of this patent is extended or adjusted under 35 U.S.C. 154(b) by 337 days.

(21) Appl. No.: 10/160,420

(22) Filed: May 30, 2002

(65) Prior Publication Data

US 2003/0008942 A1  Jan. 9, 2003

(30) Foreign Application Priority Data

Jun. 6, 2001   (JP) ............................... 2001-170883

(51) Int. Cl.
  *C09D 11/10* (2006.01)
  *C08K 9/10* (2006.01)
(52) U.S. Cl. .................. 523/160; 523/201; 523/206
(58) Field of Classification Search ................ 523/160, 523/161, 201, 205, 206
See application file for complete search history.

(56) References Cited

U.S. PATENT DOCUMENTS

| | | | |
|---|---|---|---|
| 4,812,141 A * | 3/1989 | Baumgartner et al. | 8/506 |
| 5,661,197 A * | 8/1997 | Villiger et al. | 523/161 |
| 5,958,998 A | 9/1999 | Foucher et al. | 523/160 |
| 6,025,412 A | 2/2000 | Sacripante et al. | 523/161 |
| 6,057,384 A | 5/2000 | Nguyen et al. | 523/160 |
| 6,712,894 B1 * | 3/2004 | Shepard | 106/31.6 |
| 2003/0010252 A1 * | 1/2003 | Arita et al. | 106/31.27 |
| 2003/0078320 A1 * | 4/2003 | Yatake | 523/160 |
| 2003/0195274 A1 * | 10/2003 | Nakamura et al. | 523/160 |

FOREIGN PATENT DOCUMENTS

| | | |
|---|---|---|
| EP | 0 732 381 A1 | 9/1996 |
| EP | 0 861 880 A1 | 9/1998 |
| EP | 0 989 167 A1 | 3/2000 |
| GB | 2344825 A | 6/2000 |
| JP | 2002012802 A * | 1/2002 |

OTHER PUBLICATIONS

Machine Translation of JP 2002012802 A (2002).*

* cited by examiner

*Primary Examiner*—Callie Shosho
(74) *Attorney, Agent, or Firm*—Squire, Sanders & Dempsey L.L.P.

(57) ABSTRACT

A water-based ink comprising water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) particles comprising a core forming polymer containing a colorant and a shell forming polymer which encapsulates the core forming polymer,
wherein the initial elution value of the colorant of the colored particles being measured in a colorant dissolving solvent is at most 10% of the maximum elution value.

8 Claims, 1 Drawing Sheet

WATER-BASED INK COMPRISING COLORED PARTICLES AND IMAGE FORMING METHOD USING THE SAME

FIELD OF THE INVENTION

The present invention relates to a water-based ink containing fine colored particles and an image forming method using the same.

BACKGROUND OF THE INVENTION

In recent years, it has been demanded that recording materials as well as inking materials, which are employed in printers, printing presses, markers, and writing means be free of organic solvents and be comprised of water. Specifically, widely employed as water-based recording materials are ones which are mainly comprised of an aqueous water-soluble dye solution and of a dispersion of fine pigment particles.

Employed as water-based ink utilizing water-soluble dyes is one which is prepared by adding moisture retention agents such as glycols and alkanolamines, and surface active agents to control surface tension, and if desired, viscosity increasing agents (or thickeners) to an aqueous solution of water-soluble dyes which are classified into acidic dyes, direct dyes, and some food dyes. Water-based ink employing said water-soluble dyes is most commonly employed due to its high reliability for minimized clogging at writing tips or recording systems. However, water-based ink employing such water-soluble dyes tend to result in bleeding on recording paper sheets due to the fact that the employed dyes are water-soluble. As a result, their use is limited and the recording quality inevitably degrades. In addition, it is difficult to assume that water-soluble dyes, which simply penetrate into a paper sheet, retained and dried, are subjected to "dying". As a result, the resulting light fastness is not fully acceptable.

As methods to overcome said drawbacks of water-based ink prepared by utilizing water-soluble dyes, addition of fine resinous particles such as emulsion and latex have been investigated over an extensive period. Japanese Patent Publication Open to Public Inspection No. 55-18418 proposes an ink jet recording material to which a latex is added which is "one type of a colloid composition prepared by dispersing a component such as rubber and resins into water in the form of fine particles (having a particle diameter of about 0.01 to several μm) employing an emulsifier." In order to improve light fastness as well as to minimize effects such as bleeding by the addition of said latex as proposed by said patent, the necessary amount of said latex is larger than the amount of used dyes. As a result, it becomes very difficult to assure dispersion stability as well as ejection stability.

In order to solve problems with low water fastness as well as low light fastness of the water-based ink comprising said water-soluble dyes, several proposals have been made for ink jet recording ink in which water-dispersible resins are colored with oil-soluble dyes or hydrophobic dyes. For instance, Japanese Patent Publication Open to Public Inspection Nos. 55-139471, 58-45272, 3-250069, 8-253720, 8-92513, 8-183920, and 2001-11347 propose ink comprising emulsion polymerization particles dyed with oil-soluble dyes or dispersed polymerization particles. In water-based ink employing such fine colored particles, when said dyes are present on the surface of said particles or in the exterior of said particles, the desired effects are not fully realized. As a result, it is hard to improve various kinds of performance such as dispersion stability, ejection stability, and light fastness.

On the other hand, with regard to pigments, in order to improve dispersion stability, ejection stability, and lightfastness, tried has been covering pigment particles with film forming resins other than dispersing agents. For example, Japanese Patent Publication Open to Public Inspection Nos. 8-269374, 9-151342, 10-88045, and 10-292143 describe examples in which pigment particles are covered with resins. However, it is not easy to totally cover minute pigment particles with resins. Currently, covered pigment particles have not yet been developed which exhibit superior performance compared to conventional pigment dispersions.

As noted above, a water-based ink, comprising fine colored particles employing oil-soluble dyes or pigments, has hidden potential to realize high recording quality while overcoming said drawbacks. However, various problems are left unsolved and improvements are still sought.

SUMMARY OF THE INVENTION

An object of the present invention is to provide a fine colored particle-containing water-based ink which exhibits excellent dispersion stability, results in overcoming the problems regarding ejection stability, and exhibits excellent water fastness as well as excellent light fastness.

The object of the present invention was achieved employing the following embodiments.

(1) A water-based ink comprising water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) colored particles comprising a core forming polymer containing a colorant and a shell forming polymer which encapsulates the core forming polymer, wherein the initial elution value of the colorant of the colored particles being measured in a colorant dissolving solvent is at most 10% of the maximum elution value.

The colored particles showing a high initial elution value are considered to be in a state in which the colorant is not completely included in the particles and is dissolved or dispersed in water. Consequently, the colorant which is not covered with the polymer would deteriorate the dispersion stability, ink-jetting stability, water fastness or light fastness of the image.

(2) A water-based ink comprising water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) colored particles comprising a core forming polymer containing a colorant and a shell forming polymer which encapsulates the colorant, wherein an elution value of the colorant of the colored particles being measured in a colorant dissolving solvent at 2 minutes is at most 50% of the maximum elution value.

The elution value at 2 minutes indicates the degree of colorant keeping ability by the polymer. When this degree is weak, the colorant tends to diffuse out from the particles, and as a result, there increases the colorant which is not covered with the polymer and it deteriorates the image stability.

(3) The water-based ink of item 1, wherein an elution value of the colorant of the colored particles at 2 minutes is at most 50% of the maximum elution value.
(4) The water-based ink of item 1, wherein the colorant is a dye.
(5) The water-based ink of item 2, wherein the colorant is a dye.
(6) The water-based ink of item 4, wherein the colored particles comprises a core forming polymer containing a colorant and a shell forming polymer which encapsulates the core forming polymer.
(7) The water-based ink of item 5, wherein the colored particles comprises a core forming polymer containing a colorant and a shell forming polymer which encapsulates the core forming polymer.
(8) The water-based ink of item 1, wherein the colorant is a pigment.
(9) The water-based ink of item 2, wherein the colorant is a pigment.
(10) The water-based ink of item 1, wherein the volume average diameter of the colored particles is from 5 to 100 nm.
(11) The water-based ink of item 2, wherein the volume average diameter of the colored particles is from 5 to 100 nm.
(12) The water-based ink of item 1, wherein the weight ratio of the colorant to the core forming polymer is from 50 to 133%.
(13) The water-based ink of item 2, wherein the weight ratio of the colorant to the core forming polymer is from 50 to 133%.
(14) An ink-jet recording ink comprising a water-based ink comprising water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) colored particles comprising a core forming polymer containing a colorant and a shell forming polymer which encapsulates the core forming polymer, wherein the initial elution value of the colorant being measured in a colorant dissolving solvent is at most 10% of the maximum elution value.
(15) The ink-jet recording ink of item 14, wherein the weight ratio of the colorant to the core forming polymer is from 50 to 133%.
(16) An ink-jet recording ink comprising a water-based ink comprising water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) colored particles comprising a core forming polymer containing a colorant and a shell forming polymer which encapsulates the core forming polymer, wherein an elution value of the colorant of the colored particles being measured in a colorant dissolving solvent at 2 minutes is at most 50% of the maximum elution value.

(17) The ink-jet recording ink of item 16, wherein the weight ratio of the colorant to the core forming polymer is from 50 to 133%.
(18) A method for ink-jet recording comprising the step of: jetting droplets of a water-based ink from an ink-jet head operated by digital signals onto an ink receptive medium, wherein the water-based ink comprises water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) particles comprising a core forming polymer containing a colorant and a shell forming polymer which encapsulates the core forming polymer, wherein the initial elution value of the colorant of the colored particles being measured in a colorant dissolving solvent is at most 10% of the maximum elution value.
(19) The method for ink-jet recording of item 18, wherein the weight ratio of the colorant to the core forming polymer is from 50 to 133%.
(20) A method for ink-jet recording comprising the step of: jetting droplets of a water-based ink from an ink-jet head operated by digital signals onto an ink receptive medium, wherein the water-based ink comprises water and at least one kind of colored particles selected from the group consisting of:
(a) colored particles comprising a polymer containing a colorant;
(b) colored particles comprising a core forming colorant and a shell forming polymer which encapsulates the core forming colorant; and
(c) colored particles comprising a core forming polymer containing a colorant and a shell forming polymer which encapsulates the core forming polymer, wherein the elution value of the colorant of the colored particles being measured in a colorant dissolving solvent at 2 minutes is at most 50% of the maximum elution value.
(21) The water-based ink of item 20, wherein the weight ratio of the colorant to the core forming polymer is from 50 to 133%.

DETAILED DESCRIPTION OF THE INVENTION

Figure 1:
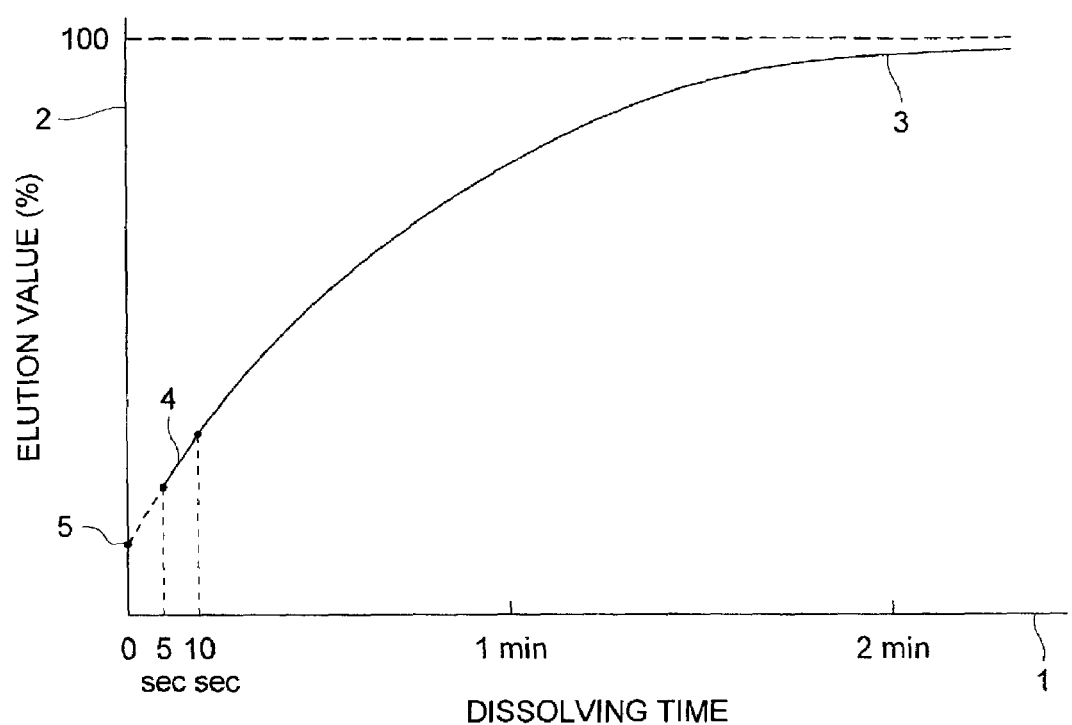
FIG. 1 is a schematic diagram indicating a time-dependent solubility curve.

The present invention will now be detailed further. The present invention was achieved based on the following discovery. Various kinds of performance, such as dispersion stability, ejection stability, and light fastness, depend on the coloring material distribution in the interior as well as the exterior of fine colored particles, the completeness of the polymer film covering particles, the interaction between the polymers and coloring materials, and the solubility of coloring materials in ink solvents. As a result, various kinds of excellent performance were achieved by adjusting to the specified value the elution value of the coloring materials with respect to coloring material solvent employed in fine colored particles.

The colorant dissolving solvents employed to measure the elution value of the colorant of the colored particles of the present invention are the solvents which dissolve colorants (or coloring materials) at 20° C. in an amount of 1 to 200 g/l, and various solvents, ranging from hydrophobic solvents to hydrophilic solvents, may be employed. Solvents, which dissolve said coloring materials in an amount of 30 to 100 g/l are preferred. Even though suitable solvents differ depending upon coloring materials, solvents, which have a compatibility parameter (being an Sp value) near that of coloring materials, are commonly preferred. For dyes, listed are ethyl acetate, dichloromethane, dichloroethane, chloroform, toluene, tetrahydrofuran, methanol, and acetone. However, taking into account the Sp value of employed dyes, hydrophobic dyes are preferred, and ethyl acetate is specifically preferred.

When coloring materials are pigments, preferred are concentrated sulfuric acid and diluted sulfuric acid; Lewis acid such as trifluoroacetic acid; dimethyl sulfoxide and N,N-dimethylformamide having both inorganic and organic bases. Of these, sulfuric acid is particularly preferred. In the case of hydrophobic solvents which result in phase separation from water, it is easy to determine the elution value of dyes based on the absorbance. However, in the case of water-soluble solvents, separation procedures are required. It is possible to employ common methods for separating solvents from dispersed solids, such as filtration, salting-out, precipitation with an acid, centrifugal separation, and extraction.

When any solvent, which satisfies conditions as said solvents, has its initial elution value in the specified range, said solvent is regarded as one being in the present invention. The initial elution value of coloring materials of the present invention is determined while ink and the coloring material solvent are mixed in a ratio from 1:1 to 1:39 (ink to the coloring material solvent measured by weight). Due to the ease of spectral absorption measurement, the measurement of said elution value is preferably carried out in a ratio of 1:19. Said elution value of coloring materials is determined as follows: From the start of mixing time, absorbance is monitored at specified times and the spectral absorption is thereby determined. The concentration at the time, when all the dyes are eluted into the solvents, is designated as 100 percent and the ratio at each point in time is plotted. During said measurement, the measuring solution should not be vigorously stirred nor shaken. Stirring is carried out employing a magnetic stirrer at a rotation rate of less than or equal to 100 rpm.

The initial elution value is explained by using FIG. 1. FIG. 1 is a schematic diagram and the numbers in which are indicating as follows.

Number 1 is an axis of abscissa indicating the time,
Number 2 is an axis of ordinate indicating the ratio of solubility of a colorant, which is called "Elution value".
Number 3 is a time-dependent solubility curve,
Number 4 is a line which passes both the point of 5 seconds and the point of 10 seconds of the time-dependent solubility curve,
Number 5 is a point of intersection of the line 4 and the axis of ordinate 2.

The initial elution value of the present invention is determined by using the time-dependant solubility curve. The time-dependent solubility curve can be obtained by measuring the absorption density of the colorant that dissolves in the solvent with time while being kept stirring. The maximum elution value is determined from the absorption density of the dissolved colorant in which no increase of absorption density with time is achieved.

The value of an axis of ordinate for the point of intersection of the line 4 and the axis of ordinate (time 0) is defined as the initial elution value.

The ratio of the initial elution value to the maximum elution value is called the initial elution ratio.

The initial elution value is preferably 10 percent or less, and is more preferably 5 percent or less, and still more preferably 3 percent or less. The elution value of coloring materials after two minutes from the start of the measurement may be obtained utilizing interpolation. The elution value of said coloring materials after two minutes is preferably 50 percent or less and more preferably 30 percent or less.

From the viewpoint of dispersion stability as well as ejection stability, the average diameter of fine colored particles is preferably from 5 to 100 nm. The most preferred use is for ink for ink jet printing.

Employed as coloring materials in the present invention may be various coloring materials which are mainly divided into dyes and pigments. Listed as dyes may be examples such as oil-base (oleophilic) dyes, dispersion dyes, direct dyes, acidic dyes, and basic dyes. However, from the viewpoint of the elution value of the present invention, it is preferable to employ oil-base dyes as well as dispersion dyes. Preferably employed as colors are yellow, magenta, cyan, black, blue, green, and red. Dyes of yellow, magenta, cyan, and black are particularly preferred. Oil-base dyes include dyes which exhibit oil solubility by forming salts of water-soluble dyes with long chain bases. Specific examples of particularly preferred oil-base dyes include, but are not limited, to the following examples:

Valifast Yellow 4120, Valifast Yellow 3150, Valifast Yellow 3108, Valifast Yellow 2310N, and Valifast Yellow 1101; Valifast Red 3320, Valifast Red 3304, and Valifast Red 1306; Valifast Blue 2610, Valifast Blue 2606, and Valifast Blue 1603; Oil Yellow GG-S, Oil Yellow 3G, Oil Yellow 129, Oil Yellow 107, and Oil Yellow 105; Scarlet 308; Oil Red RR, Oil Red OG, and Oil Red 5B; Oil Pink 312; Oil Blue BOS, Oil Blue 613, and Oil Blue 2N; Oil Black BY, Oil Black BS, Oil Black 860, Oil Black 5970, Oil Black 5906, and Oil Black 5905, all being manufactured by Orient Chemical Industries Co., Ltd.;

Kayaset Yellow SF-G, Kayaset Yellow K-CL, Kayaset Yellow GN, Kayaset Yellow A-G, and Kayaset Yellow 2G; Kayaset Red SF-4G, Kayaset Red K-BL, and Kayaset Red A-B; Kayaset Magenta 312; and Kayaset Blue K-FL, all being manufactured by Nippon Kayaku Co., Ltd.;

FS Yellow 1015, FS Magenta 1404, FS Cyan 1522, and FS Blue 1504; C.I. Solvent Yellow 88, C.I. Solvent Yellow 83, C.I. Solvent Yellow 82, C.I. Solvent Yellow 79, C.I. Solvent Yellow 56, C.I. Solvent Yellow 29, C.I. Solvent Yellow 19, C.I. Solvent Yellow 16, C.I. Solvent Yellow 14, C.I. Solvent Yellow 04, C.I. Solvent Yellow 03, C.I. Solvent Yellow 02, and C.I. Solvent Yellow 01; C.I. Solvent Red 84:1, C.I. Solvent Red 84, C.I. Solvent Red 218, C.I. Solvent Red 132, C.I. Solvent Red 73, C.I. Solvent Red 72, C.I. Solvent Red 51, C.I. Solvent Red 43, C.I. Solvent Red 27, C.I. Solvent Red 24, Solvent Red 18, and Solvent Red 01; C.I. Solvent Blue 70, C.I. Solvent Blue 67, C.I. Solvent Blue 44, C.I. Solvent Blue 40, C.I. Solvent Blue 35, C.I. Solvent Blue 11, C.I. Solvent Blue 02, and C.I. Solvent Blue 01; C.I. Solvent Black 43, C.I. Solvent Black 70, C.I. Solvent Black 34, C.I. Solvent Black 29, C.I. Solvent Black 27, C.I. Solvent Black 22, C.I. Solvent Black 7, and C.I. Solvent Black 3; C.I.

Solvent Violet 3; and C.I. Solvent Green 3 and C.I. Solvent Green 7, all being manufactured by Arimoto Chemical Co., Ltd.

Further, metal complex dyes, as shown in Japanese Patent Publication Open to Public Inspection Nos. 9-177693, 10-20559, and 10-30061, are preferably employed. The preferred structure is represented by Formula (1) described below.

$$M(Dye)_l(A)_m \qquad \text{Formula (1)}$$

wherein M represents a metal ion; Dye represents a dye capable of forming a coordination bond with metal; A represents a ligand except for said dye; l represents 1, 2, or 3; and m represents 0, 1, 2, or 3. When m represent 0, 1 represents 1 or 2. In that instance, Dye may be the same or different. Listed as metals represented by M are, for example, ions of Al, Co, Cr, Cu, Fe, Mn, Mo, Ni, Sn, Ti, Pt, Pd, Zr, and Zn. From the viewpoint of color as well as various kinds of durability, ions of Ni, Cu, Cr, Co, Zn, and Fe are particularly preferred. Of these, Ni ions are most preferred.

Considered as dyes, represented by Dye, capable of forming a coordination bond with metal may be those having various structures. Dyes having a ligand in the skeleton of conjugated methine dyes, azomethine dyes and azo dyes are preferred.

Specific examples of particularly preferred dispersion dyes include, but are not limited to, the following:

C.I. Disperse Yellow 5, 42, 54, 64, 79, 82, 83, 93, 99, 100, 119, 122, 124, 126, 160, 184:1, 186, 198, 199, 204, 334, and 237; C.I. Disperse Orange 13, 39, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 230, 240, 258, 277, 278, 283, 311, 323, 3543, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

Pigments employed in the present invention include, but are not limited to, the examples shown below. Particularly preferred specific examples of black pigments include:

No. 2300, No. 900, MCF-88, No. 33, No. 40, No. 45, No. 52, MA7, MA8, MA100, No. 2200B, all manufactured by Mitsubishi Chemical Corporation;

Raven 700, Raven 5750, Raven 5250, Raven 5000, Raven 3500, and Raven 1255, all manufactured by Columbia Co.;

Regal 400R, Regal 330R, and Regal 660R; Mogul; Monarch 700, Monarch 800, Monarch 880, Monarch 900, Monarch 1000, Monarch 1100, Monarch 1300, and Monarch 1400, all manufactured by Cabot Co.;

Color Black FW1, Color Black Color FW2, Black Color Black FW2V, Color Black FW18, Color Black FW200, Color Black S150, Color Black S160, and Color Black S170; Printex 35, Printex U, Printex V, Printex 140U, and Printex 140V; Special Black 6, Special Black 5, Special Black 4A, and Special Black 4, all manufactured by Degussa Corporation; and Maxsorb G-40, Maxsorb G-15, and Maxsorb G-08, all being manufactured by Kansai Netuskagaku Co., Ltd.

Yellow pigments include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154.

Magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (ca), C.I. Pigment Red 57:1, C.I. Pigment Red 112, C.I. Pigment Red 123, C.I. Pigment Red 168, C.I. Pigment Red 184, and C.I. Pigment Red 202.

Listed as cyan pigments are C.I. Pigment Blue 1, C.I. Pigment Blue 2, C.I. Pigment Blue 3, C.I. Pigment Blue 15:3; C.I. Pigment Blue 15:34, C.I. Pigment Blue 16, C.I. Pigment Blue 22, C.I. Pigment Blue 60, C.I. Vat Blue 4, and C.I. Pigment Blue 60.

It is possible to prepare fine colored particles employing various methods. For examples, methods include a method in which when coloring materials are, for example, dyes, oil-base dyes are dissolved in monomers, and after emulsification in water, dyes are enclosed in polymers employing polymerization, a method in which polymers and coloring materials are dissolved in organic solvents, and after emulsification in water, said organic solvents are removed, and a method in which minute porous polymer particles are added to a dye solution so that dyes are adsorbed onto and impregnated into said minute particles. It is possible that said minute colored particles are further covered with polymers so as to form a shell.

When one of the above-mentioned methods is employed in which polymers and coloring materials are dissolved in organic solvents, and after emulsification in water, said organic solvents are removed, it is preferable to use a solvent which does not dissolve in water in an amount of at most 10 weight %, such as ethyl acetate.

When the colored particles have a core-shell structure, the covering of the colorant with the polymer is increased. One of the preferable shell formation methods is an in-situ polymerization method in which a polymer is formed in the place where a monomer is supplyed.

When coloring materials are pigments, methods include a method in which said pigments are kneaded with polymers and subsequently, the resultant blend is dispersed into a water-based medium so as to prepare pigment cores covered with polymers, and a method in which a solution prepared by dissolving polymers in organic solvents is added to a pigment dispersion and subsequently, polymer covering is carried out while removing solvents under reduced pressure. Further, it is possible that the resultant fine colored particles result in a shell structure. Methods to provide a polymer shell around said particles include a method in which water-soluble polymer dispersing agents are added to a water-based suspension of said core so as to result in adsorption, a method in which monomers are gradually dripped so as to simultaneously undergo polymerization and deposition on the core surface. In addition, a method in which a core-shell is formed in one stage is acceptable. For example, polymers and coloring materials which are to form cores are dissolved in or dispersed into polymers which are to form shells, the resultant mixture is suspended in water and subsequently undergoes polymerization, or is carried out while the resultant composition is gradually dripped into water comprising micelle of surface active agents. Alternatively, coloring materials are dissolved in or dispersed into monomers capable forming cores as well as forming shells after polymerization and the resultant mixture undergoes suspension polymerization or emulsion polymerization.

The fine colored particles of the present invention may or may not be comprised of a shell structure. The fine particles without a shell structure is described as (a) in item (1) of the present invention. In these particles are contained a colorant substantially uniformly distributed in the body of particles. The fine particles having a shell structure are described as (b) and (c) in item (1) of the present invention. However, from the viewpoint of the effects of the present invention, the fine colored particles, which are comprised of said shell structure, are more preferred. The ratio of polymers which are employed to form the shell is from 5 to 95 percent by weight based on the total amount of polymers. When said ratio is less than or equal to 5 percent by weight, the thickness of the shell becomes insufficient. As a result, a part of the core, which comprises a large amount of coloring materials, tends to appear on the particle surface. On the other hand, when the amount of polymers, which are employed to form the shell, is excessively large, the function to protect coloring materials in the core tends to be degraded. As a result, said polymer ratio is more preferably from 10 to 90 percent by weight.

It is preferable to use at least two kinds of monomers to form a shell structure of the present invention: a monomer having a high degree of hydrophobicity (e.g. styrene) and a monomer having a high degree of hydrophilicity (e.g. HEMA), and it is preferable to use at least 50 weight % of the colorant.

The weight ratio of coloring materials is preferably from 20 to 1,000 percent by weight with respect to the weight of the total polymers. When the amount of coloring materials is excessively small compared to the polymers, the image density after ejecting does not increase, while when the weight of coloring materials is excessively large, the protection function of polymers is not sufficiently exhibited.

The weight ratio of coloring materials to the core forming polymer is more preferably from 50 to 133 percent by weight with respect to the weight of the total polymers. A sufficient amount of the core forming polymer is preferably required.

(Evaluation of Core-Shell Formation)

It is important to evaluate practical core-shell formation. In the present invention, since the diameter of each particle is markedly small, to such a degree of less than or equal to 100 nm, analytical methods are limited from the viewpoint of resolution. Employed as analytical methods, which achieve said purposes, may be TEM and TOF-SIMS. When fine core-shell particles are observed utilizing TEM, a dispersion is applied onto a film comprised of carbon and subsequently dried, whereby the resultant coating may be observed. Images observed utilizing said TEM are commonly monochromatic. Therefore, in order to identify core-shell formation, it is necessary to dye said fine particles. Accordingly, only fine core particles are dyed and the resultant particles are observed utilizing said TEM and compared to shell particles. Further, shell particles and non-shell particles are blended and subsequently dyed. It is then confirmed that the ratio of fine particles having a different degree of dying corresponds to the presence and absence of shell particles. In said TOF-SIMS, it is confirmed that by forming the shell on the surface of particles, the amount of coloring materials adjacent to the surface decreases compared to the formation of the core alone. When said coloring agents do not contain an element which is contained in a core-shell polymer, it is possible to confirm the formation of the shell which contains a lesser amount of coloring materials while utilizing said element as a probe. When no such element is available, it is possible to compare the content of said coloring materials in the shell to that forming no shell, while employing a suitable coloring agent. The core-shell formation may more clearly be observed in such a manner that core-shell particles are buried into an epoxy resin, and an ultra-thin slice is cut employing a microtome followed by dying the resultant slice. When polymers or coloring materials comprise an element which is employed as a probe, it is possible to estimate core-shell compositions as well as the amount of coloring agents distributed into the core as well as into the shell.

In order to achieve the desired particle diameter, it is important to optimize the formula as well as to select a suitable emulsification method. Said formula varies depending upon the coloring materials as well as the polymers which are employed. However, since particles are suspended in water, it is generally required that shell polymers are more hydrophilic than core polymers. Further, the content ratio of coloring agents incorporated into said shell polymers is preferably less than that comprised into core polymers. In addition, it is required that said coloring agents also be less hydrophilic than said shell polymers. It is possible to estimate hydrophilicity as well as hydrophobicity utilizing, for example, solubility parameters (SP). Regarding said solubility parameters, values, measurement, and calculation methods may be referred to the page 675 and the following of Polymer Handbook, Fourth Edition (John Wiley & Sons, Inc.).

Further, from the viewpoint of layer forming properties after printing, durability, and suspension forming properties, the number average molecular weight of polymers employed in fine color particles is preferably from 500 to 100,000, and is more preferably from 1,000 to 30,000.

The Tg of said polymers is not particularly limited. However, it is preferable to use at least one polymer having a Tg of at least 10° C.

In the present invention, almost all of the commonly known polymers may be employed, but particularly preferred polymers include polymers having an acetal group as a major functional group, polymers having a carbonic acid ester, polymers having a hydroxyl group, and those having an ester group. Said polymers may have a substituent which may be comprised of a straight chain, a branched chain, or a cyclic structure. Various types of said polymers having a functional group are commercially available, but may be synthesized using conventional methods. Further, copolymers of these may be obtained as follows. For example, an epoxy group is introduced into one polymer molecule, and subsequently, the resultant polymer undergoes condensation polymerization with other polymers. Said polymers may also be obtained by carrying out graft polymerization utilizing light as well as radioactive rays.

Listed as polymers having acetal as a major group are polyvinyl butyral resins, which include, for example, #2000-L, #3000-1, #3000-2, #3000-4, #3000-K, #4000-1, #4000-2, 5000-A, #6000-C, and #6000-EP, all manufactured by Denki Kagaku Kogyo Co., Ltd., and BL-1, BL-1H, BL-2, BL-2H, BL-5, BL-10, BL-S, BL-SH, BX-10, BX-L, BM-1, BM-2, BM-5, BM-S, BM-SH, BH-3, BH-6, BH-S, BX-1, BX-3, BX-5, KS-10, KS-1, KS-3, and KS-5, all manufactured by Sekisui Kagaku Kogyo Co., Ltd.

Said polyvinyl butyral resins are obtained as derivatives of PVA (polyvinyl alcohol). The acetylation ratio of hydroxyl group of original PVA is, at maximum, approximately 80 mol percent, and is commonly from about 50 to 80 mol percent. Incidentally, acetal, as described herein, does not refer to a 1,1-diethoxyethane group under its narrow definition, but refers to common orthoaldehyde compounds.

Employed as other polymers containing acetal as a major functional group may be the Iupital Series, manufactured by Mitsubishi Engineering-Plastics Corporation.

Listed as polymers having carbonic acid esters as a major functional group are polycarbonate resins, which includes, for example, the Iupilon Series and the NOVAEX Series, both being manufactured by Mitsubishi Engineering-Plastics Corporation., Ltd. Said Iupilon Series is manufactured employing Bisphenol A as a raw material and those having various molecular weight may be employed, even though said molecular weight may differ depending upon its determination method. Said NOVAREX Series may be employed which has a molecular weight of 20,000 to 30,000 and a glass transition point of approximately 150° C. However, said NOVAREX Series is not limited to those having said molecular weight.

The polymers having a carbonic acid ester as a major functional group, as described herein, refer to those in which at least 30 mol percent of oxygen atoms incorporated in said polymers contribute to the formation of said carbonic acid ester.

Listed as polymers having a hydroxyl group as a major functional group are PVAs. Many PVAs exhibit low solubility in organic solvents, while PVAs having a low saponification value exhibit higher solubility. PVAs having high water solubility may be employed in such a manner that they are added to a water phase and after removing organic solvents, are adsorbed onto suspended polymers.

Employed as PVAs may be commercially available products which include, for example, Kuraray POVAL PVA-102, PVA-117, PVA-CSA, PVA-617, and PVA-505, and in addition, special brand PVAs as a sizing agent, and heat fusion molding PVAs. Employed as other functional polymers may be MP-203, HL-12E, and SK-5102. Those having a degree of saponification of at least 50 mol percept are commonly employed. On the other hand, it is also possible to employ those having a degree of saponification of approximately 40 mol percent such as LM-10HD. It is further possible to employ those having a hydroxyl group which are not included in common PVA. It is still further possible to employ those in which at least 20 mol percent of oxygen atoms included in polymers form a hydroxyl group.

Listed as polymers having an ester group as a major functional group are, for example, methacrylic resins. It is possible to employ 560F, 60N, 80N, LP-1, SR8500, and SR6500 of the Delpet Series, manufactured by Asahi Kasei Co., Ltd. The polymers having an ester group as a major functional group, as described herein, refer to those in which at least 30 mol percent of oxygen atoms incorporated in said polymers form said ester group.

These polymers may be employed individually or in combination. Further, when at least 50 percent by weight of said polymers are incorporated, other polymers, as well as inorganic fillers, may be incorporated.

Copolymers of these polymers may preferably be employed. Such copolymers may be prepared employing the following method. For example, polymers having a hydroxyl group are copolymerized with various polymers in such a manner that said hydroxyl group is allowed to react with monomers such as glycidyl methacrylate having an epoxy group, and subsequently, the resultant product undergoes copolymerization with methacrylic acid ester monomers, employing suspension polymerization.

In the fine colored particle-containing water-based ink of the present invention, the polymers employed in said fine colored particles are preferably blended with said ink at a ratio of 0.5 to 50 percent by weight and more preferably at a ratio of 0.5 to 30 percent by weight. When the blended amount of said polymers is less than 0.5 percent by weight, the protection properties of the coloring material are not sufficient. On the other hand, when said blended amount exceeds 50 percent by weight, the storage stability as suspension ink is degraded and printer head clogging occasionally occurs due to the increase in viscosity as well as coagulation of the suspension at the nozzles tips. As a result, said blended amount is preferably adjusted to the range described above.

On the other hand, said coloring materials are preferably blended with said ink in an amount of 1 to 30 percent by weight and more preferably in an amount of 5 to 25 percent by weight. When the blending amount of said coloring materials is less than 1 percent by weight, the resultant printing density does not become high enough, while when said blending amount exceeds 30 percent by weight, the storage stability of said suspension is degraded so that the particle diameter tends to increase due to coagulation. Therefore, the blending amount is preferably adjusted to remain within said range.

The fine colored particle-containing water-based ink of the present invention is comprised of a polymer suspension enclosing said coloring materials, employing water as a medium. Incorporated into said suspension may be various types of conventional additives, known in the art, including, for example, wetting agents such as polyhydric alcohols, dispersing agents, antifoaming agents, antifungal agents such as chloromethylphenol and/or chelating agents such as EDTA, as well as oxygen absorbing agents such as nitrite salts.

Employed as said wetting agent are, for example, polyhydric alcohols and ethers thereof such as ethylene glycol, propylene glycol, diethylene glycol, triethylene glycol, tetraethylene glycol, polyethylene glycol, glycerin, diethylene glycol diethyl ether, diethylene glycol mono-n-butyl ether, ethylene glycol monomethyl ether, ethylene glycol monoethyl ether, ethylene glycol monobutyl ether, methylcarbitol, ethylcarbitol, butylcarbitol, ethylcarbitol acetate, diethylcarbitol, triethylene glycol monomethyl ether, triethylene glycol monoethyl ether, and propylene glycol monomethyl ether; acetates; nitrogen containing compounds such as N-methyl-2-pyrrolidone, 1,3-dimethylimidazolidinone, triethanolamine, formamide, and dimethylformamide; and dimethylsulfoxide. These compounds may be employed individually or in combination of two or more types. The blending ratio of these wetting agents is not particularly limited, and it is possible to blend these wetting agents with said ink preferably in an amount of 0.1 to 50 percent by weight, and more preferably in an amount of 0.1 to 30 percent by weight.

Further, said dispersing agents are not particularly limited. However, from the viewpoint of exhibiting the desired effects as dispersing agents as well as exhibiting effects to retard an increase in diameter of the particles in suspension, their HLB value is preferably from 8 to 18.

It is possible to employ commercially available products as said dispersing agents. Listed as such commercially available products are, for example, dispersing agents such as Demol SNB, MS, N, SSL, ST, and P (Demol being the trade name), manufactured by Kao Corp.

The blending ratio of said dispersing agents is not particularly limited, but their blending ratio in the ink of the present invention is preferably from 0.01 to 10 percent by weight. When the blending ratio of said compounds is less than 0.1 percent by weight, it is difficult to decrease the diameter of particles in the suspension, while when said blending ratio exceeds 10 percent by weight, the diameter of particles in said suspension increases whereby the stability of said suspension decreases, resulting in a tendency of gelling. As a result, the blending ratio is preferably controlled to remain within said range.

Further, said antifoaming agents are not particularly limited, and it is possible to employ commercially available products. Listed as such commercially available products are, for example, KF96, 66, and 69; KS68, 604, 607A, 602, and 603; and KM73, 73A, 73E, 72, 72A, 72C, 72F, 82F, 70, 71, 75, 80, 83A, 85, 89, 90, 68-1F, and 68-2F, all being manufactured under such type numbers by Shin-Etsu Silicone Co. The blending ratio of these compounds is not particularly limited, but the blending ratio of these in the fine colored particle-containing water-based ink of the present invention is preferably from 0.001 to 2 percent by weight. When the blending ratio of said compounds is less than 0.001 percent by weight, bubbles tend to form during the preparation of ink and such minute bubbles in ink are not easily removed. On the other hand, when said blending ratio exceeds 2 percent by weight, bubble formation is assuredly retarded, but printing quality occasionally degrades due to repellency among ink droplets. Accordingly, said blending ratio is preferably controlled to remain within said range.

The production method of the ink of the present invention will now be described. It is possible to produce the ink of the present invention employing various types of emulsification methods.

Various emulsification methods may be employed. The examples of said methods are summarized in, for example, the description on page 86 of "Kinohsei Nyukazai•Nyukagijutsi no Shinpo to Ohyohtenkai (Functional Emulsifiers and Progress and Application of Emulsifying Technology) CMC". In the present invention, preferably employed are emulsification dispersion devices utilizing ultrasonic, high speed rotation shearing, and high pressure.

Emulsification dispersion utilizing ultrasonic may be carried out employing either a batch system or a continuous system. Said batch system is suitable for production of samples in a relatively small amount, while said continuous system is suitable for production of samples in a relatively large amount. In said continuous system, it is possible to employ devices such as UH-600SR, manufactured by MMT. In the case of said continuous system, ultrasonic application time can be obtained based on the formula of volume of a dispersion chamber/flow rate×circulation frequency. When a plurality of ultrasonic devices is employed, ultrasonic application time can be calculated as the sum of said applying time of each device. In practice, ultrasonic applying time is required to be at least 3 seconds. If emulsification is finished within said time, said ultrasonic homogenizer is not needed. On the other hand, if said applying time is at least 10,000 seconds, load applied to the process markedly increases and in practice, it is necessary to decrease the emulsification dispersion time through selecting emulsifiers and the like. Accordingly, 10,000 seconds are not needed. Said time is preferably from 10 to 2,000 seconds.

Employed as emulsification dispersion devices utilizing high speed rotation shearing may be disper mixers described on pages 255 and 256 of "Kinohsei Nyukazai•Nyukagijutsu no Shinpo to Ohyohtenkai (Functional Emulsifiers and Progress and Application of Emulsifying Technology) CMC", homomixers described on page 251 of the same, and ultra-mixers described on page 256 of the same. Any of these types may be employed depending upon the viscosity of compositions during emulsification dispersion. In these emulsification dispersion devices utilizing high speed rotation shearing, the rotation frequency of the stirring blade plays a major role. Clearance between the blade and the stator is commonly about 0.5 mm, which is not markedly narrow. As a result, shearing force depends on the peripheral speed of the stirring blade. The stirring blade, having a peripheral speed of 5 to 150 m/second, can be applied to emulsification dispersion of the present invention. When said peripheral speed is less than the lower limit, it is frequently impossible to decrease the particle diameter to the desired level, even though the emulsification time is extended. On the other hand, in order to achieve a peripheral speed of 150 m/second, it is required to markedly enhance the performance of the driving motor. Therefore, the peripheral speed is more preferably from 20 to 100 m/second.

In emulsification dispersion utilizing high pressure, LAB 2000 (manufactured by SMT Co.) may be employed. Its emulsification dispersion ability depends on the pressure applied to the samples. Said pressure is preferably from 100 to 5,000 kg/cm$^2$. If desired, the target particle diameter may be obtained by several repetitions of emulsification and dispersion. When said pressure is less than the lower limit, the target particle diameter is not frequently obtained, even though emulsification dispersion is repeated many times. Incidentally, it is not practical to achieve a pressure of 5,000 kg/cm$^2$ because an excessively large load is applied to the device. Accordingly, the applied pressure is more preferably from 500 to 2,000 kg/cm$^2$.

These emulsification dispersion devices may be employed individually, or if desired, in combination. If colloid mills and flow jet mixers are used individually, they cannot achieve the objectives of the present invention. However, when they are employed in combination with said devices, it is possible to enhance the desired effects of the present invention in such a manner that emulsification dispersion can be carried out in a shorter time.

Further, it is possible to produce the ink of the present invention utilizing phase inversion emulsification, instead of employing said devices.

The phase inversion emulsification is comprised of the following processes. The aforesaid polymers are dissolved in organic solvents such as esters and ketones, along with the aforesaid dyes. If desired, carboxyl groups in said polymers are ionized by the addition of neutralizers. After adding water, said organic solvents are removed so as to result in water-based phase inversion.

After finishing phase inversion, the resultant system is heated under reduced pressure so as to remove said ester and ketone based solvents as well as the specified amount of water, whereby the fine colored particle-containing water-based ink of the present invention, which has the desired concentration, is prepared.

It is possible to use the fine colored particle-containing water-based ink of the present invention as ink, other than ink jet recording ink, for example, ink for writing means such as common fountain pens, ball-point pens, and fiber-tipped pens.

EXAMPLES

The fine colored particle-containing water-based ink of the present invention will now be detailed with reference to examples. Needless to say, the present invention is not limited to these examples.

Synthetic Example 1

Core Type Fine Dye-colored Particles

Charged into a separable flask were 4.6 g of polyvinyl butyral (BL-S, having an average degree of polymerization of 350, manufactured by Sekisui Kagaku Co., Ltd.), 3.1 g of Dye A, and 45 g of ethyl acetate, and air in said flask was replaced with nitrogen gas. Subsequently, said polymer and dye were thoroughly dissolved while stirring. Thereafter, 90 g of an aqueous solution containing 1.9 g of sodium laurylsulfate was added dropwise and stirred. The resultant mixture was then emulsified for 300 seconds employing an ultrasonic homogenizer (Type UH-150, manufactured by MST Co., Ltd.). Thereafter, ethyl acetate was removed under reduced pressure whereby fine colored particles, impregnated with said dye, were prepared. The average particle diameter was 87 nm. Incidentally, the particle diameter in the present invention refers to the volume average particle diameter which is determined employing a laser particle analysis system, manufactured by Ohtsuka Denshi Co., Ltd.

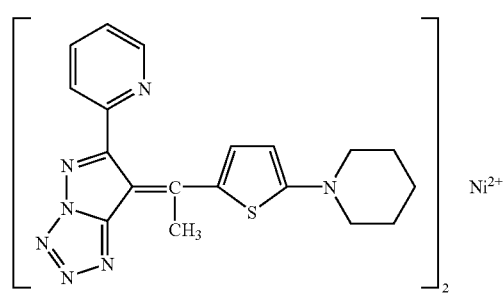

Dye A

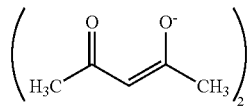

Synthetic Example 2

Core-shell Type Fine Colored Particles

Added to the core type fine colored particle dispersion, prepared in Synthetic Example 1, was 0.15 g of potassium persulfate, which was dissolved. The resultant dispersion was heated to 80° C., employing a heater. Subsequently, the heated solution underwent reaction for 7 hours while dripping a solution containing 1.5 g of styrene and 1.5 g of 2-hydroxyethyl methacrylate, whereby core-shell type fine colored particles were prepared. The average particle diameter was 98 nm.

Comparative Synthetic Example 1

Comparative fine colored particles were synthesized employing the same formula as Synthetic Example 1, except that the amount of polyvinyl butyral was varied to 2 g. The average particle diameter was 150 nm.

Synthetic Example 3

Core-shell Type Fine Colored Particles

Charged into a separable flask were 4.6 g of polyvinyl butyral (BL-S, having an average degree of polymerization of 350, manufactured by Sekisui Kagaku Co., Ltd.), 3.1 g of C.I. Solvent Yellow 88 and 45 g of ethyl acetate, and air in said flask was replaced with nitrogen gas. Subsequently, said polymer and dye were thoroughly dissolved while stirring. Thereafter, 90 g of an aqueous solution containing 1.9 g of sodium laurylsulfate was added dropwise and stirred. The resultant mixture was then emulsified for 300 seconds employing an ultrasonic homogenizer (Type UH-150, manufactured by MST Co., Ltd.). Thereafter, ethyl acetate was removed under reduced pressure whereby fine colored particles impregnated with said dye were prepared. Added to the resultant particles was 0.15 g of potassium persulfate, which was then dissolved. The resultant dispersion was heated to 80° C., employing a heater. Subsequently, the heated solution underwent reaction for 7 hours while dripping a solution containing 1.5 g of styrene and 1.5 g of 2-hydroxyethyl methacrylate, whereby core-shell type fine colored particles were prepared. The average particle diameter was 89 nm.

Comparative Synthetic Example 2

Comparative fine colored particles were synthesized employing the same formula as Synthetic Example 3, except that the amount of polyvinyl butyral was varied to 2 g. The average diameter was 170 nm.

Synthetic Example 4

Fine Pigment Colored Particles

Added to a dispersion, comprised of particles having an average diameter of 150 nm, comprising 50 g of C.I. Pigment Red 122, was 0.15 g of potassium persulfate and dissolved. The resultant dispersion was heated to 80° C. employing a heater. Subsequently, the heated solution underwent reaction for 7 hours while dripping a solution containing 20 g of styrene and 20 g of 2-hydroxyethyl methacrylate, whereby fine pigment colored shell particles were prepared. The average particle diameter was 98 nm.

Comparative Synthetic Example 3

Comparative fine pigment colored particles were synthesized employing the same formula as Synthetic Example 4, except that the amount of styrene was decreased to 10 g and the amount of 2-hydroxyethyl methacrylate was decreased to 10 g. The average diameter was 270 nm.

Example 1

The content of coloring materials, ethylene glycol, and glycerin in each of fine colored particles synthesized as above was adjusted to 2 percent, 10 percent, and 10 percent, respectively, and the resultant particles were added to said dispersion. Thereafter, the resultant dispersion was filtered to remove dust and coarse particles, whereby ink jet inks 1 through 7, as shown in Table 1, were prepared.

Regarding these inks, the elution value of coloring materials was determined under the condition of ink: coloring material solvent=1:19 (as a weight ratio) while employing ethyl acetate as the coloring material solvent for the fine dye-colored particles, and employing 80 percent sulfuric acid for the fine pigment-colored particles.

Further, each of the inks was employed in an ink jet printer (Model No. PM-800) and printing was carried out employing Konica Photo Jet Paper, Photolike QP Glossy (manufactured by Konica Corporation). Subsequently, waterfastness as well as lightfastness of resultant prints was evaluated.

Evaluation Methods

Elution Value of Coloring Materials

The elution value of fine dye-colored particles was determined as follows. The absorbance of an ethyl acetate layer was monitored every 30 seconds, employing MCPD-2000 (manufactured by Ohtsuka Denshi Co., Ltd.) and the absorbance at the time, when no increase was detected, was designated as 100 percent of said elution value. Then said elution value was plotted over time. The elution value of fine pigment-colored particles was determined in the following manner. Said particles were sampled at every specified time and each sample was quickly neutralized, employing sodium hydroxide. Subsequently, solids were separated employing an ultracentrifuge and the filtrate obtained by filtering the resultant, employing a membrane filter, was subjected to spectral photometry, and the elution value of the coloring materials was obtained in the same manner as fine dye-colored particles.

Dispersion Stability

Each ink was stored at 60° C. for one week and was evaluated based on the criteria shown below.

A (acceptable level): variation among the particle diameters was less than 5 percent
B (acceptable level): variation among the particle diameters was from 5 to 10 percent
C (unacceptable level): variation among the particle diameters was more than or equal to 10 percent.

Ejection Stability

Ejection stability was evaluated based on these criteria:
A (acceptable level): during continuous ejection employing the printer, no nozzle lack occurred during at least 10 minutes
B (acceptable level): no nozzle lack occurred during at least 5 minutes
C (unacceptable level): nozzle lack occurred during less than 5 minutes.

Waterfastness Test

Water was dripped on a print employing a micropipette. After one minute, the resultant print was rubbed with fingers and image blurring was evaluated based on the criteria shown below.
A: acceptable level
C: unacceptable level Lightfastness Test Lightfastness was tested employing a low temperature weather meter XL75 (manufactured by Suga Shikenki Co.). Further, density variation was determined employing X-Rite 900 (manufactured by Nihon Heiban Kizai Co.). Resultant lightfastness was evaluated based on these criteria:

When the coloring materials were dyes, after a one-week test:
A (acceptable level): the residual density was at least 60 percent
B (acceptable level): the residual density was from 40 to 60 percent
C (unacceptable): the residual density was less than 40 percent.

When the coloring materials were pigments, after a 40-day test:
A (acceptable level): the residual density was at least 90 percent
C: (unacceptable level): the residual density was less than 90 percent.

TABLE 1

| Ink Number | Fine Colored Particles | Weight ratio of the colorant to the core forming polymer | Initial Elution Value | Elution Value after 2 minutes | Dispersion Stability | Ejection Stability | Water fastness | Light fastness |
| --- | --- | --- | --- | --- | --- | --- | --- | --- |
| 1 (Present Invention) | Synthetic Example 1 | 68% | 2% | 21% | B | A | A | B |
| 2 (Present Invention) | Synthetic Example 2 | 68% | 1% | 13% | A | A | A | A |
| 3 (Beyond Present Invention) | Comparative Synthetic Example 1 | 154% | 11% | 83% | C | C | C | C |
| 4 (Present Invention) | Synthetic Example 3 | 68% | 1% | 35% | B | A | A | B |
| 5 (Beyond Present Invention) | Comparative Synthetic Example 2 | 154% | 13% | 69% | C | C | C | C |
| 6 (Present Invention) | Synthetic Example 4 | 80% | 9% | 43% | B | B | A | B |
| 7 (Beyond Present Invention) | Comparative Synthetic Example 3 | 250% | 20% | 55% | C | C | C | B |

As can clearly be seen from Table 1, Ink Nos. 1, 2, 4, and 6, which comprised fine colored particles of the present invention, which exhibited the initial elution value of 10 percent or less, and an elution value after 2 minutes of 50 percent or less, exhibited excellent dispersion stability, ejection stability, waterfastness and lightfastness. On the other hand, Nos. 3, 5, and 7, which had the elution value of coloring materials beyond the present invention, exhibited inferior performance regarding all the criteria.

As detailed above, fine colored particle-containing water-based ink can be prepared which exhibits excellent dispersion stability, ejection stability, waterfastness, and light fastness.

What is claimed is:

1. A water-based ink comprising water and at least one kind of colored particles that comprise a core forming polymer containing the colorant and the shell forming polymer which encapsulates the core forming polymer, wherein the initial elution value of the colorant of the colored particles being measured in a colorant dissolving solvent is at most 10% of the maximum elution value, and wherein the colorant is a dye.

2. A water-based ink comprising water and at least one kind of colored particles comprising a core forming polymer containing a colorant and a shell forming polymer which encapsulates the core forming polymer, wherein the initial elution value of the colorant of the colored particles being measured in a colorant dissolving solvent is at most 10% of the maximum elution value, wherein the weight ratio of the colorant to the core forming polymer is from 50 to 133%, and wherein the colorant is a dye.

3. A water-based ink comprising water and at least one kind of colored particles that comprise a core forming polymer containing a colorant and a shell forming polymer which encapsulates the core forming polymer, wherein an elution value of the colorant of the colored particles being measured in a colorant dissolving solvent at 2 minutes is at most 50% of the maximum elution value, and wherein the colorant is a dye.

4. A water-based ink comprising water and at least one kind of colored particles comprising a core forming polymer containing a colorant and a shell forming polymer which encapsulates the core forming polymer, wherein an elution value of the colorant of the colored particles being measured in a colorant dissolving solvent at 2 minutes is at most 50% of the maximum elution value, wherein the weight ratio of the colorant to the core forming polymer is from 50 to 133%, and wherein the colorant is a dye.

5. An ink-jet recording ink comprising a water-based ink comprising water and at least one kind of colored particles comprising a core forming polymer containing a colorant and a shell forming polymer which encapsulates the core forming polymer, wherein the initial elution value of the colorant being measured in a colorant dissolving solvent is at most 10% of the maximum elution value, wherein the weight ratio of the colorant to the core forming polymer is from 50 to 133%, and wherein the colorant is a dye.

6. An ink-jet recording ink comprising a water-based ink comprising water and at least one kind of colored particles comprising a core forming polymer containing a colorant and a shell forming polymer which encapsulates the core forming polymer, wherein an elution value of the colorant of the colored particles being measured in a colorant dissolving solvent at 2 minutes is at most 50% of the maximum elution value, wherein the weight ratio of the colorant to the core forming polymer is from 50 to 133%, and wherein the colorant is a dye.

7. A method for ink-jet recording comprising the step of: jetting droplets of a water-based ink from an ink-jet head operated by digital signals onto an ink receptive medium, wherein the water-based ink comprises water and at least one kind of colored particles comprising a core forming polymer containing a colorant and a shell forming polymer which encapsulates the core forming polymer, wherein the initial elution value of the colorant of the colored particles being measured in a colorant dissolving solvent is at most 10% of the maximum elution value, wherein the weight ratio of the colorant to the core forming polymer is from 50 to 133%, and wherein the colorant is a dye.

8. A method for ink-jet recording comprising the step of: jetting droplets of a water-based ink from an ink-jet head operated by digital signals onto an ink receptive medium, wherein the water-based ink comprises water and at least one kind of colored particles comprising a core forming polymer containing a colorant and a shell forming polymer which encapsulates the core forming polymer, wherein the elution value of the colorant of the colored particles being measured in a colorant dissolving solvent at 2 minutes is at most 50% of the maximum elution value, wherein the weight ratio of the colorant to the core forming polymer is from 50 to 133%, and wherein the colorant is a dye.

* * * * *